United States Patent [19]

Tomson

[11] 4,348,791
[45] Sep. 14, 1982

[54] APPARATUS AND METHODS FOR ASSEMBLING END SHIELD ASSEMBLIES FOR DYNAMOELECTRIC MACHINES

[75] Inventor: James M. Tomson, Fort Wayne, Ind.

[73] Assignee: General Electric Company, Fort Wayne, Ind.

[21] Appl. No.: 128,085

[22] Filed: Mar. 7, 1980

[51] Int. Cl.³ .............................................. H02K 15/14
[52] U.S. Cl. ........................................ 29/598; 29/235; 29/732; 310/42; 310/90
[58] Field of Search ................. 29/596, 598, 732, 235; 310/90, 42; 308/132

[56] References Cited
U.S. PATENT DOCUMENTS

| | | | |
|---|---|---|---|
| 3,820,863 | 6/1974 | Otto | 308/132 |
| 3,961,416 | 6/1976 | Otto | 29/596 |
| 4,198,584 | 4/1980 | Otto | 310/90 |

*Primary Examiner*—Carl E. Hall
*Attorney, Agent, or Firm*—Ralph E. Krisher, Jr.

[57] ABSTRACT

Methods, apparatus, and systems are provided for automatically assembling end shield assemblies of sub-assemblies for electric motors. In a preferred form, a system and methods are provided that utilize a non-palletized, non-synchronous concept to convey end shields through a number of assembly stations. At process stations situated along a conveyor, operations are performed on components. One method includes controlling traffic of sub-assemblies by toggle type escapements. A stop or latch of unique design stops end shield components in midstream, and "lifts" of unique design disengage parts from the conveyor and also support such parts during various operations. Photo-optic devices and proximity and reed switch mechanisms are utilized for control purposes. The work stations involved in one system include a unique assembly and pressing station involving oil well covers; a unique feed wick seating system; a unique lubricant adding operation; and unique "building block" mechanisms and methods.

18 Claims, 9 Drawing Figures

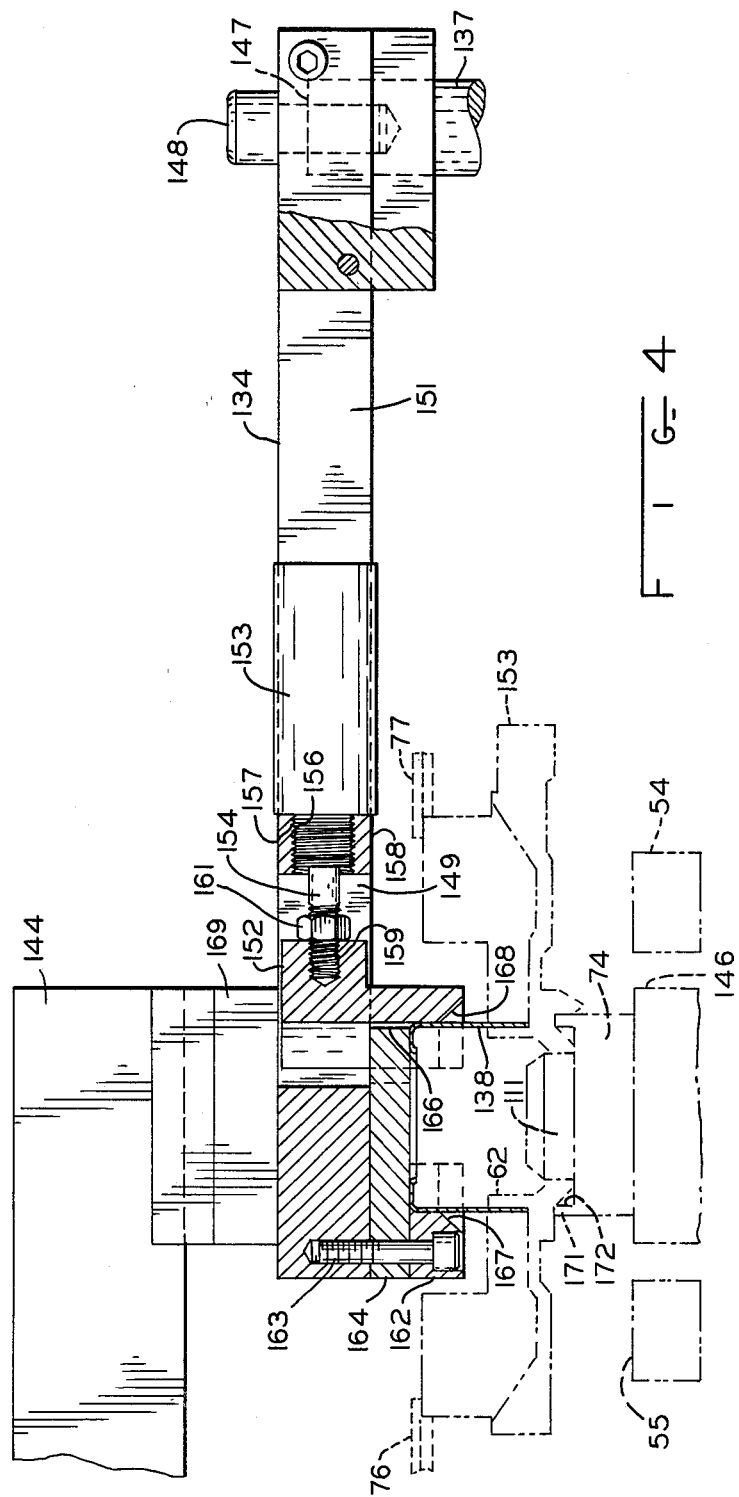

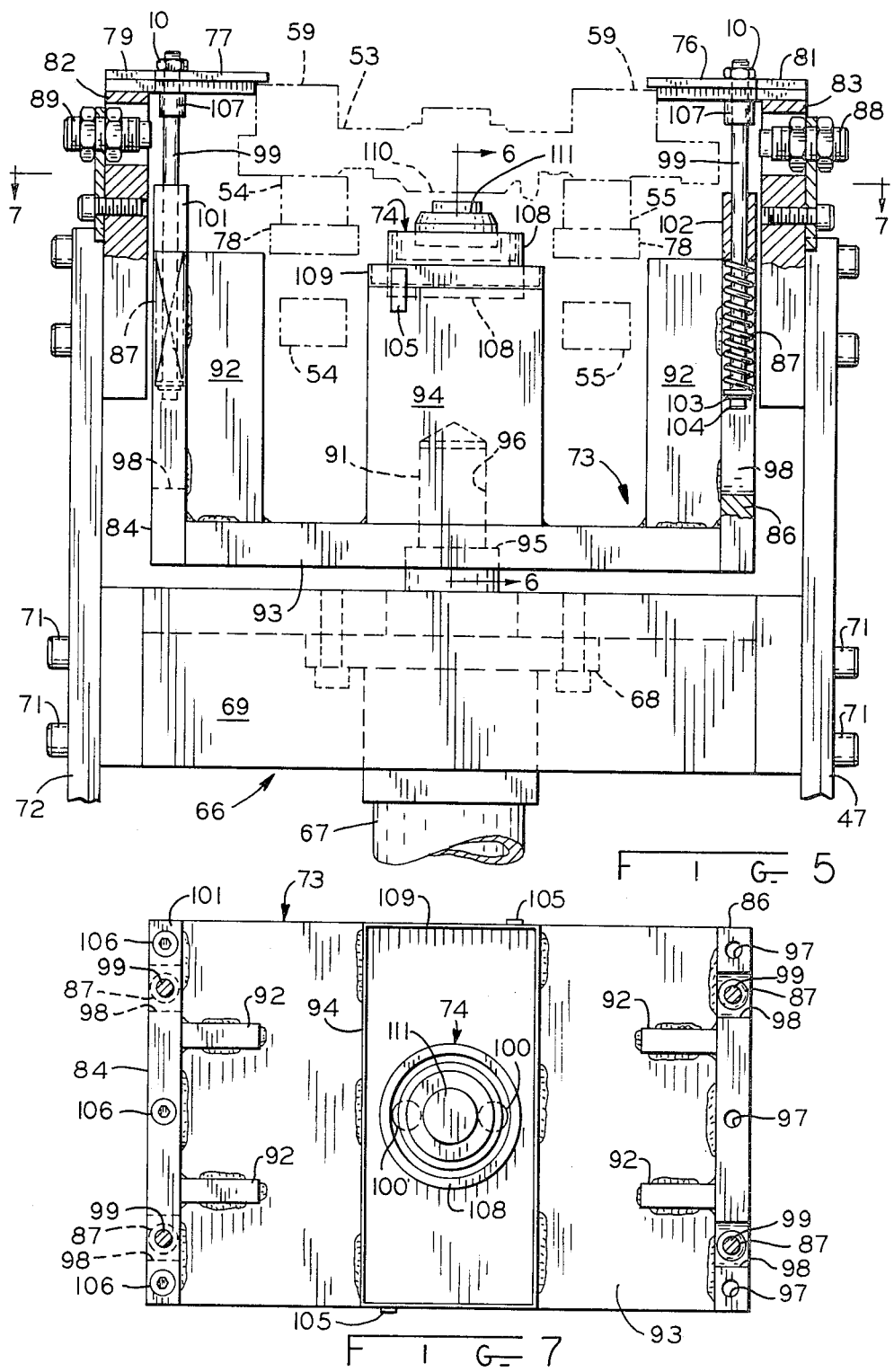

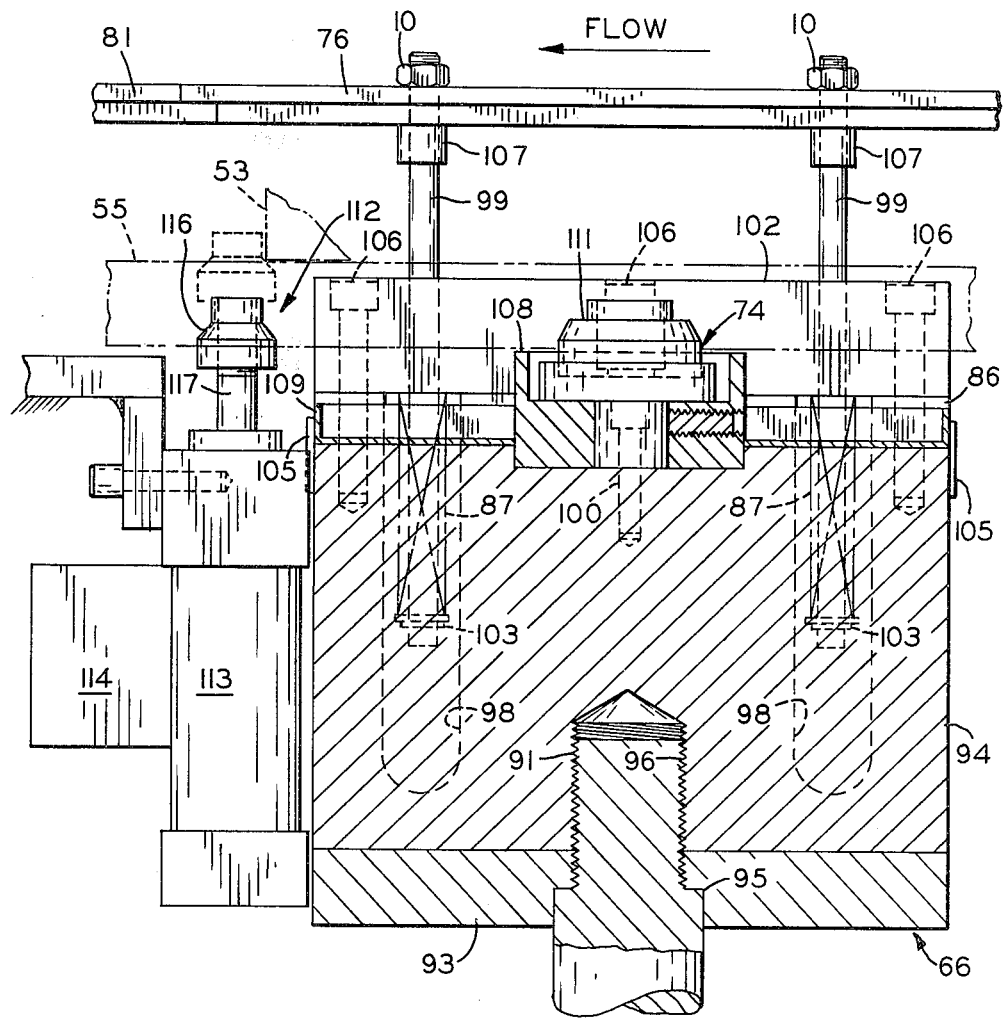
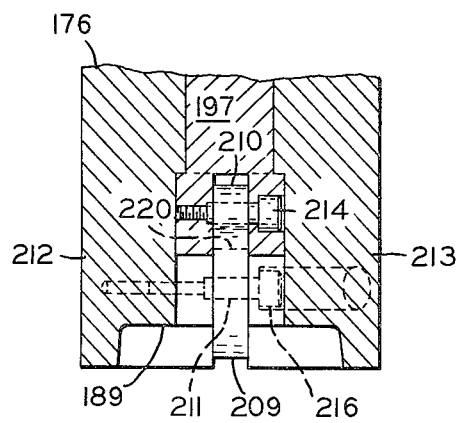

APPARATUS AND METHODS FOR ASSEMBLING END SHIELD ASSEMBLIES FOR DYNAMOELECTRIC MACHINES

BACKGROUND OF THE INVENTION

The present invention relates generally to methods and apparatus for automatically assembling end shield assemblies for dynamoelectric machines.

As will be understood by persons of ordinary skill in the dynamoelectric machine art, dynamoelectric machines such as, for example, electric motors include (among other things) sub-assemblies that are variously known in the art as "end bell", "end shield", or "end frame" assemblies. Typically, such assemblies include a bearing (usually of either the sleeve or ball type), a centrally located hub or other structure for supporting the bearing and spokes, plate elements, etc., that are used for interconnecting and supporting the bearing hub in a predetermined dimensional relationship with respect to the bore of the stator of the motor. Depending upon the specific design of a particular motor, the end frame may be attached to the stator by welding, a mechanical interlock, through-bolts, structural adhesives, diecast materials, and so forth. In addition to the above mentioned components of an end shield assembly, such assembly will also frequently include a lubricant storage and lubricant circulation system for the bearing; and an appropriate means for retaining a bearing lubricant storage and circulating material within a desired region so that adequate lubrication of the bearing will be maintained.

The region in which bearing lubricant is stored is often referred to as an "oil reservoir" or "oil well", even though the motor lubricant is normally retained within the reservoir by means of felt material or an extrudable oil retaining material such as that disclosed for example in Whitt U.S. Pat. No. 3,894,956 (which issued July 15, 1975, and is assigned to the assignee of this application) or as disclosed for example in Abel U.S. Pat. No. 2,966,459. Material such as that disclosed in the Whitt patent is now known in the motor industry as "GE-LUBE", while materials disclosed in the above and other Abel patents (all owned by the "Permawick Company") are marketed under the trademark "Permawick" by the Permawick Company.

For completeness, it is also noted that end frame assemblies may also at times include other elements such as those of an axial thrust bearing system and, those which are used to return oil to the lubricant storage material.

End frame assemblies used in the motor art include structural members that may be stamped from steel, diecast from aluminum or other materials, or may be made from cast iron. Regardless of the particular materials or elements used in an end frame assembly, it has been common practice in the art to manually handle and assemble the various components making up each end frame sub-assembly. Accordingly, it will be understood that it would be of great value to increase productivity in the motor industry by providing methods and means by which the assembly of end frame assembly components could be automatically accomplished and with a minimum of manual labor. Moreover, it would be desirable that such methods and means be devised so that they would be readily adaptable for use with differently designed end frame assemblies having components thereof made from different materials, and wherein different elements or components are used for different end frame assembly designs.

It would also be desirable to devise methods, apparatus, and materials handling systems for use in the automated assembly of dynamoelectric machine end frame sub-assemblies by following a "building block" approach such that basically similar (if not identical) mechanisms and components may be used at different work stations along an assembly line.

Accordingly, it is a general object of the present invention to provide new and improved methods, systems, and apparatus particularly adapted for the manufacture of dynamoelectric machine end frame sub-assemblies.

It is a more particular object of the present invention to provide new and improved methods, systems, and apparatus for use in the automated assembly of end shield sub-assemblies wherein similar procedural steps or mechanisms, as the case may be, are utilized to control traffic and the flow of parts in an automated end shield sub-assembly production line.

It is another object of the present invention to provide new and improved methods, apparatus, and systems whereby end frame sub-assemblies may be manufactured in an in-line, non-palatized, non-synchronous production sequence.

Still other and more specific objects of the present invention are to provide new and improved methods and apparatus for various assembly operations or manipulative procedures, such as: controlling movement of parts on a conveyor; accurately stopping and holding parts on a conveyor; lifting parts from a conveyor; assembling parts, and seating or otherwise manipulating at least one part relative to another.

SUMMARY OF THE INVENTION

In carrying out the above and other objects of the present invention, in one preferred form thereof, methods, apparatus, and systems are provided for automatically assembling end shield assemblies or sub-assemblies for electric motors. In a preferred form, a system and methods are provided that utilize a non-palatized, non-synchronous concept to convey end shields through a number of assembly stations. In this preferred embodiment, process stations are suitated along the length of a conveyor and operations are performed on end shield components as they flow into each of the stations. The preferred method includes controlling traffic of the sub-assemblies by toggle type escapements which can selectively restrain the flow of end shield components and release individual end frame members one at a time so that they may flow into a succeeding operation. Moreover, a stop or latch of a unique and novel design is utilized so as to stop end shield components in midstream so that they may be worked upon at desired work stations. Furthermore, "lifts" of unique design are utilized for disengaging parts to be worked upon from the conveyor and for supporting such parts during various assembly operations. In addition, photo-optic detectors are provided, and by this means provision is made for detecting end shield parts flow and availability. Moreover, proximity and reed switch mechanisms are utilized to detect mechanical motions of various mechanisms in preferred systems.

In carrying out methods embodying the present invention, an operator insures that end shield components are moved onto a conveyor in a predetermined orientation and, for example, at a first escapement location a determination is made whether or not an oil feed wick has been provided in the sub-assembly on the conveyor. Thereafter, the escapement mechanism permits movement of such sub-assembly to a lifting station where a latch impedes further movement of the sub-assembly and whereupon the sub-assembly is raised and retained at a work station. The work stations involved in a system illustrated herein include a unique assembly and pressing station involving oil well covers, a unique feed wick seating system; a unique lubricant adding operation; a lubricant storage material forming operation when desired; a lubricant storage material cleaning operation; and unique "building block" mechanisms and methods performed by the same.

The subject matter which I regard as my invention is set forth in the appended claims. The invention itself, however, together with further objects and advantages thereof may be better understood by now referring to the following more detailed description taken in conjunction with the drawings.

BRIEF DESCRIPTION OF THE DRAWINGS

FIG. 4 is an elevation, with parts in section and parts removed, (looking in an "upstream" direction) of a pick and place assembly mechanism shown in FIG. 2 and also wherein a portion of a "building block" lift mechanism is shown in phantom;

FIG. 5 is an elevation, with parts in section and parts removed, looking in a "downstream" direction (i.e., in the direction of parts flow) taken at a lubricant injection station, and wherein more details of a "building block" lift mechanism are revealed;

FIG. 6 is a view, with parts removed, taken in the direction of the lines 6—6 in FIG. 5;

FIG. 7 is a view, with additional parts removed, taken in the direction of lines 7—7 on FIG. 5;

FIG. 9 is a view taken in the direction of line 9—9 in FIG. 8.

DESCRIPTION OF THE PREFERRED EMBODIMENTS

Figure 1:
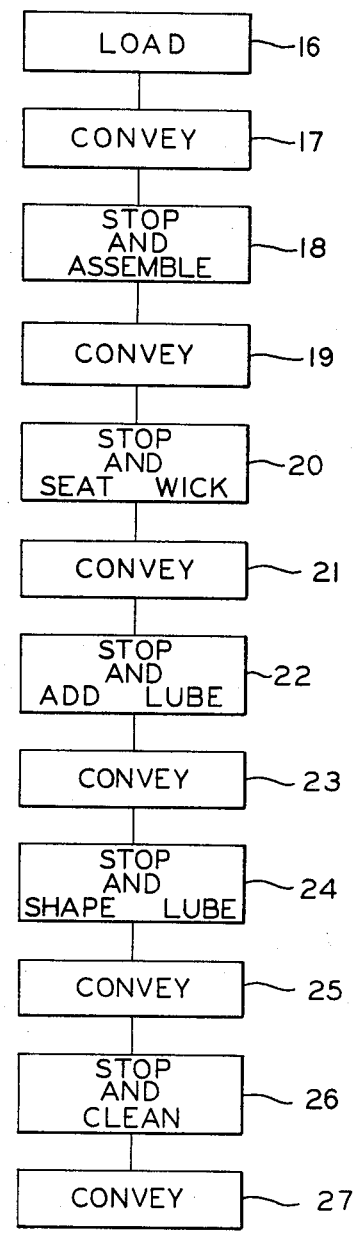
FIG. 1 is a simplified flow chart indicating various procedural steps that may be carried out when practicing my method in one preferred form thereof, and indicating some of the work operations that may be performed in one system embodying the invention in one specific form thereof.

With reference now to FIG. 1, an overview of a method embodying one specific application of the present invention will be provided in order to better orient the reader. At the outset, however, it is noted that a number of specific details of apparatus embodying the invention in another form, and the relationship of various parts in one specific system embodying yet other aspects of the invention, are not specifically identified in FIG. 1.

FIG. 1 is intended to represent an inline system and a number of procedural steps whereby end shield sub-assemblies such as those specifically illustrated in Otto U.S. Pat. Nos. 3,820,863 and 3,961,416 may be assembled and lubricated with lubricant material of the type described in the above referenced Whitt or Abel patents while using an injection head as illustrated in detail for example in either Stoner application Ser. No. 946,553 (filed on Sept. 28, 1978, and assigned to the assignee of this application) or as disclosed in detail in Tomson et al patent application Ser. No. 946,569 (filed Sept. 28, 1978, and assigned to the assignee of this application).

The entire disclosures of all of the just mentioned Whitt, Abel, Stoner, and Tomson et al patents and applications are specifically incorporated herein by reference. Also incorporated by reference herein are the entire disclosures of Tomson application Ser. No. 946,568 and Tomson et al application Ser. No. 946,554 which also relate to handling and injecting extrudable lubricant storage materials.

With continued reference to FIG. 1, the system there represented utilizes a non-palatized, non-synchronous concept to convey end shield assembly component parts through each of a number of different assembly or work stations. Thus it will be understood that process stations are situated along the length of the conveyor and operate on end shield component parts along the system.

In one specific exemplification, the conveyor itself consisted of three forty-two inch long conveyor sections tied together with supporting legs at the end of each section. At the incoming end of the conveyor a conventional take-up section was provided for maintaining the conveying elements under an appropriate amount of tension. The discharge end of the conveyor, on the other hand, contained a conventional drive section. The conveyor itself was comprised of a pair of "MORSE" silent chains part nos. SC-403, 27.25 feet long; at least parts of which can be seen in FIG. 2. The chains of the illustrated conveyor ride on bronze rails and return under the upper run, with support therefor being provided by conventional support rollers where and as needed. The conveyor drive may be any suitable type, but in one specific exemplification, a hydraulic motor was utilized to drive the conveyor, and the speed of the conveyor was controlled with a flow control valve in the hydraulic supply line for the drive motor. For purposes of disclosure, the speed of the conveyor in a specific embodiment of the invention has been controlled to be approximately one and one-half feet per second with lubricated end shield assemblies that weighed approximately 187 to 190 grams each. It is to be understood when analyzing FIG. 1 that the term "convey" indicates that the parts moving through the system depicted by FIG. 1 are free to move, and thus be conveyed by the continuously running conveyor chains just described.

Figure 3:
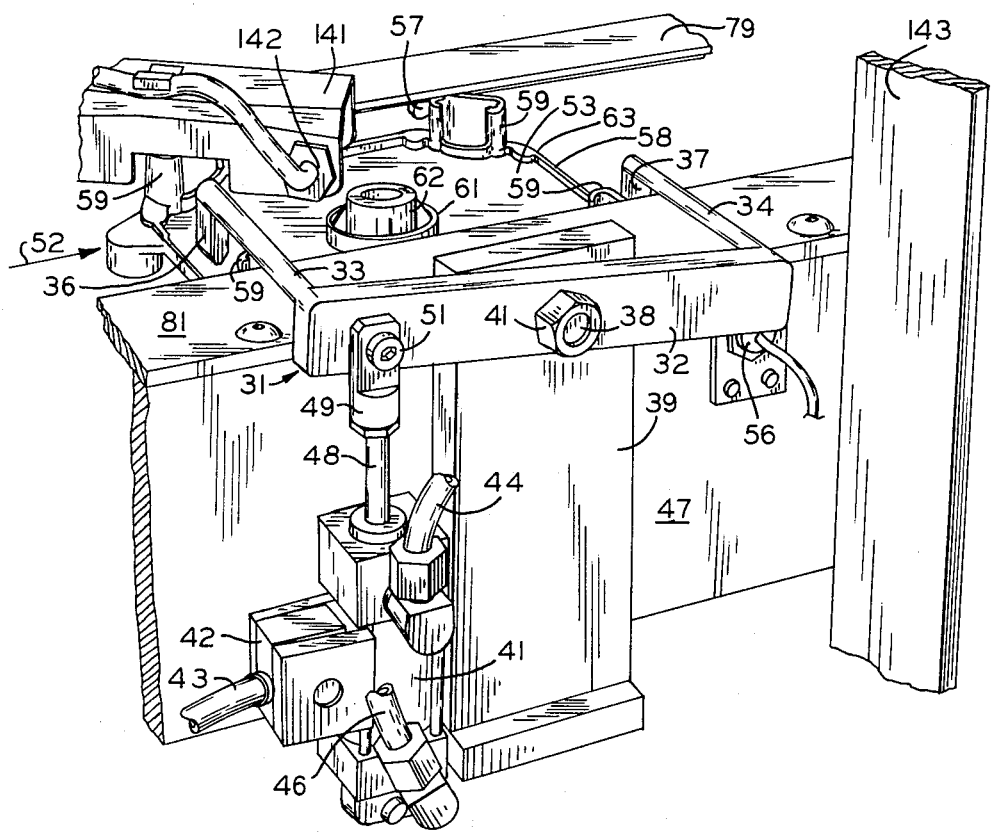
FIG. 3 is a perspective view further illustrating more detail of a portion of the station shown in FIG. 2.

With joint reference now to FIGS. 1, 3, and 6; it is noted that traffic and parts flow along the conveyor is controlled by use of toggle type escapements (See FIG. 3) which restrain the flow of end shield parts and thus cause the chain conveyor to simply slide past the restrained end shields. Then, upon activation, the toggle type escapements release end shields stopped thereby, one at a time, so that the end shield parts may flow along with the conveyor. In addition, stops or "latches" of unique design are positioned at predetermined points between the conveyor chains and are selectively actuated to move into an elevated position (see the structure shown at the left-hand side of FIG. 6). These latches stop end shield assembly parts moving along the conveyor while minimizing any rebounding action of the parts. While the parts are so stopped by the latches, the parts are then raised from the conveyor chains for pressing or other types of operations. A number of substantially identical "building block" lift mechanisms are utilized along the conveyor line and one such lift mechanism is revealed in detail in FIGS. 5 and 6. In addition, photo-optic and proximity sensors are used in the system depicted by FIG. 1 to detect end shield flow, presence, and the presence or absence of specific component parts.

With reference now confined to FIG. 1, a number of legend containing blocks, representative of one or more procedural steps, are identified sequentially with reference numerals 16–27. Initially, the conveyor is loaded (either by an operator at the beginning of the conveyor or by the discharge of parts moving to the system of FIG. 1 from another conveyor). At the time that an end frame is loaded onto the system of FIG. 1, it includes a feed wick, and each end frame is oriented in the same manner as it is loaded into the conveyor. After parts have been initially loaded onto the conveyor as depicted by block 16, the parts are conveyed a distance (as indicated by block 17) whereupon the parts are stopped by a first escapement. A photo-optic sensor then confirms that a feed wick is included with the parts present on the conveyor. The end shield and feed wick then are advanced by one of the escapement mechanisms to a first stop (block 18). Thereupon, while the end frame is restrained from moving with the conveyor, a pick and place unit (shown in FIGS. 2 and 4) moves an oil well cover into proper position with a hub on the end frame; and a lift mechanism elevates the end frame and presses the oil well cover and hub together. The end shield then is released and conveyed (as indicated by block 19) to a wick seating operation. During this time, the previously mentioned pick and place unit retrieves another oil well cover from a parts feeder and the operations described immediately herein above are repeated with a succeeding end frame.

Continuing with a description of operations involving the leading end shield, the end shield and oil well assembly is stopped by another escapement mechanism located at the wick seating station. At the wick seating station, a wick seating mechanism of novel design moves down about the previously assembled oil well cover, and a finger rotates and pushes the feed wick back against the oil cover. Thereafter, the finger rotates back to its initial position and the wick seater mechanism retracts.

Following the wick seating operation, the end shield is conveyed to a lubricant injection station and stopped; and lubricant added as indicated by block 22. A situation could arise where parts backed up at the lube station. In order to prevent malfunction of the system for this reason, a photo sensor is located just upstream from the wick seater station to detect any end shields that may back up into the oil well cover assembly station. If such a condition should be sensed, the lift mechanisms for such assembly station will be disabled until the conveyor has been cleared of the backup of end shields.

Preferably, as the parts are conveyed from the wick seater to the lube station, a proximity switch is utilized to determine that an oil well cover, in fact, is present in the sub-assembly. If such proximity detector should indicate that an oil well cover is not, in fact, present, the lubricant injection station will be disabled so that the lube inject cycle will be skipped for any end frame sub-assemblies lacking an oil well cover.

At the lube station (block 22 in FIG. 1) one of the lift mechanisms elevates the end frame sub-assembly so that it comes into communication with an injection head as disclosed in my previously mentioned co-pending application Ser. No. 946,569, and extrudable lubricant retaining material is then discharged into the lubricant reservoir of the end shield. Thereafter, the lift mechanism lowers the end shield assembly to the conveyor and the parts are conveyed (block 23) to a lube shaping station where a latch is utilized to stop the sub-assembly over yet another lift mechanism. Thereupon, the sub-assembly is once again lifted (block 24) and a plug enters the oil cover as the end frame sub-assembly is elevated. This plug insures that the injectable lubricant is packed against the oil well cover and does not obstruct the bore of the bearing contained within the end frame sub-assembly. Although it is not readily apparent from the flow chart of FIG. 1, one of the "building block" escapement mechanisms is also used to insure that parts are fed one at a time into the lube shaping station.

After the lubricant retaining material has been shaped as desired at the lube shaping station, the lift mechanism and latch are withdrawn the assembly then is conveyed to a cleaning station. At the cleaning station (block 26), a combination vacuum and air blow off device of any suitable design is lowered into proximity with the oil well cover and end frame. Excess lubricant retaining material is then either suctioned or blown away from the sub-assembly. Following the cleaning operation, an escapement mechanism releases the now finished sub-assembly, and the completed sub-assemblies are then conveyed as indicated away from the system. It will be understood that the parts leaving the system may be collected in tote boxes, or may be fed to other conveyor systems and from thence to further motor assembly operations.

Escapement Mechanisms

The system specifically illustrated herein utilizes four escapement mechanisms for the purpose of controlling the flow of end shields through the system. It will be appreciated from a review of FIG. 3 that the escapement mechanisms are toggle type devices comprising cross arms 32, a pair of arm extensions or fingers 33, 34, and stop pads 36, 37, that are connected to and depend from the arm extensions. The toggle mechanism actually illustrated in FIG. 3 is pivoted about a pivot point established by an unthreaded portion of a stud 38 anchored in an escapement main frame member 39. As will be understood, a lock nut 41 which seats against a shoulder at the end of the unthreaded portion of stud 38 holds the cross arm 32 in assembled relation with the frame member 39. The cross arm 32 is moved to, and held in its different stable positions by the action of any suitable means, but in the embodiment illustrated in FIG. 3, a PHD air cylinder #AV-P$\frac{3}{4}\times\frac{1}{2}$ with a magnetic piston was used. This cylinder is indicated by reference numeral 41 in FIG. 3. Preferably, signals indicative of the extended or retracted condition of cylinder 41 are provided for the overall control of the escapement mechanism 31. In the system illustrated herein, reed switches 42 which sense the position of the rod of a cylinder 41 are utilized for this purpose, and such reed switches provide signals that indicate the condition of cylinder 41. The reed switches 42 utilized in the system illustrated herein were PHD reed switches, #CN03-2-01-0. It will be understood by persons of ordinary skill in the art that conduit 43 contains the necessary wires for proper operation of the reed switches 43; and that conduits 44, 46, are connected to conventional control valves which supply air pressure, as required, to extend or retract the cylinder 41. The cylinder 41 is attached to the escapment frame member 39, and the reed switch 42 is directly mounted on the cylinder 41. Thus, the escapement mechanism 31 is quickly attachable by means of bolts or any other suitable fasteners to conveyor frame member 47; and is readily removable for maintenance or service as a complete mechanism.

During operation of the system illustrated herein, when the rod 48 of cylinder 41 is retracted, the clevis 49 (which is attached to rod 48) lowers clevis pin 51 which is attached to cross arm 32. Thus, cross arm 32 will pivot in a counter-clockwise direction (as viewed in FIG. 3 when rod 48 retracts) and stop pad 36 will be moved downwardly to a position such that it will block the path of end shields traveling along the conveyor in the direction of arrow 52. A stop pad 36 moves downwardly, into an interfering relationship with the flow of end shields, stop pad 37 will move upwardly and release the end shield 53 for movement with the conveyor in the direction of arrow 52. It will be understood that the conveyor itself actually comprises a pair of spaced apart chains, 54, 55, as clearly revealed in FIG. 2. While the conveyor may be any one of many different types, the system herein utilized "MORSE" silent chains #SC-403.

Referring back once again to FIG. 3, it will be understood that the conveyor in the embodiment illustrated and described herein is driven continuously, and end shields such as end shield 53 are in continuous contact with the conveyor (except when the end shields are lifted above the conveyor as described in more detail hereinbelow). Accordingly, when an end frame such as end frame 53 shown in FIG. 3 is restrained by a stop pad 36 or 37 of an escapement mechanism, the conveyor chains will simply slide thereunder. For consistency, whenever an escapement mechanism 31 has the cross arm 32 thereof in the relative position illustrated in FIG. 3, it will be described as being "open" or in an "open condition" and an end shield will be permitted to move into the work or operation station defined by the escapement mechanism. On the other hand, when the rear portion of the toggle mechanism is down (i.e., when stop pad 36 is lowered to an interfering or restraining position vis a vis end shields) the escapment mechanism will be described as being "closed" or in a "closed condition".

At stations where escapement mechanisms are utilized, photo sensors are used to detect when an end shield is present in the escapement. Such photo sensors, in the system illustrated herein, are made up of spaced apart light sources and light sensing devices. These devices are carried by the side frames of the conveyor and positioned so that the light transmitted to the sensing device by the emitting device will be broken by end frames when they move therepast. The specific devices utilized in the system illustrated herein were Skan-a-matic Corp. (of Elbridge, N.Y.) LED's, #L33007, and Skan-a-matic pick-ups #P33001. A portion of one Skan-a-matic LED is identified by reference numeral 56 in FIG. 3 and a portion of a Skan-a-matic pickup has been denoted by reference numeral 57 in FIG. 3.

It is preferred that the optical sensing devices be located so that the emitted light beam will be interrupted or blocked 3/32 of an inch (2.38 mm) prior to the end of the end shield travel as determined by a stop pad 37. The optical devices may be positioned so that the light beam will be interrupted by a leading edge 58 of an end shield, by a lug 59, an inner oil well cover hub 61, a bearing supporting hub 62, or any other desired portion of the end frame. In the system illustrated herein, the light emitting and pick-up devices were located so that the light beam would be broken by an edge portion 63 of the end shields.

Lift Mechanisms

Lift mechanisms 66 that are used in the system illustrated herein are shown in FIGS. 5-7. In the system illustrated herein, three lift mechanisms actually have been utilized for the purpose of lifting end shields from the conveyor when a pressing, assembly, or other type of operation is to be performed.

The main power for the lift mechanism is supplied by a purchased "Hydro-Line" hydraulic cylinder 67, series HR2 (1½" bore, 3" stroke, double ended). As best shown in FIG. 5, the upper flange 68 of each cylinder 67 is bolted or otherwise fastened to a cross frame member 69 which in turn is fastened by means of bolts 71 to the side frames 72, 47. These frames then are supported by the conveyor frame. A weldment, generally denoted by the reference numeral 73, is attached to the end of the cylinder 67 at each lift station. Depending upon the work station at which the lift mechanism is located, the weldment 73 in turn may carry a pressing plug/seal assembly 74. In addition, each weldment carries spring loaded end shield guide plates 76, 77.

As will be appreciated from a review of FIG. 5, the conveyor chains 54, 55 are supported on fixed slide plates 78 which in the embodiment illustrated herein were made from bronze material. Although not necessary to an understanding of the present invention, the return runs of the chains 54, 55, also can be seen in phantom in FIG. 5. In all of those sections of the conveyor system used in the embodiment described herein, the end frames 53 are directly supported by the conveyor (e.g., the chains 54, 55) as indicated in FIG. 5; except during the time that lift mechanisms hold them above the conveyor. Accordingly, the conveyor is provided with guide plates along the entire extent thereof, and such guide plates would appear in elevation to be substantially the same as the guide plates 77, 76, revealed in FIG. 5. However, to avoid confusion, the guide plates at locations along the conveyor other than the lift locations are denoted herein by the reference numerals 79, 81 (see FIGS. 2 and 3). The guide plates 79, 81, differ from the guide plates 76, 77 of FIG. 5, only in that the guide plates 79, 81, are supported directly by side frame members of the conveyor.

At the time that a lift mechanism 66 is actuated, an end frame 53 overlying such mechanism (see FIG. 5) will be raised upwardly by the lift mechanism and the spring biased guide plates 76, 77, will insure that such end shield is held against the lift mechanism. However, when the lift mechanism has returned to its lower most position (corresponding to the position of lift mechanism 66 shown in FIG. 5), the guide plates 76, 77, will come to rest against upper rails of the conveyor (e.g., rails 82, 83) or against adjacent guide plates such as guide plates 79, 81 (see FIG. 2).

As the lift mechanism returns to its lower most position, and when the guide plates 76, 77, have seated against a conveyor rail or stationary guide plates adjacent thereto, continued downward movement of the lift mechanism (as viewed in FIG. 5) will cause relative movement between side plates 84, 86, of weldment 73, and compression of springs 87.

Photosensitive devices 88, 89, respectively identical to the LED and pick-up 56, 57, are also provided at each lifting station in order to provide an indication that an end shield is either present or absent within a lifting mechanism. In addition, it is preferable that proximity switches mounted at the bottom of the main lift cylinders 67 be used in conjunction with the control means for the equipment in order to indicate when the rod of the cylinder 67 is at its uppermost and lowermost positions. Furthermore, it is preferred that spacers (e.g., shims) be placed on the bottom end of the cylinders 67 in order to prevent over travel of the lift, such spacers limiting upward movement of the rod 91 of cylinder 67.

The weldment 73 includes four webbs 92 which are welded to the side plates 84, 86, and a bottom plate 93, and spacer block 94, all as is readily apparent from FIGS. 6 and 7. The spacer block 94 is provided with a centrally disposed threaded hole 96 that is aligned with a counter sunk hole 97 in the bottom plate 93. Thus, the weldment 73 is assembled with the rod of cylinder 67 by threading such rod into the tapped hole 94.

It will be appreciated from FIG. 7, wherein parts have been removed for clarity, that tapped bolt holes 97 are provided in the upper portions of each of the side plates 84, 86; and that each of the side plates 84, 86, have slots 98 milled therein. Thus, pins 99 may be assembled with the weldment by first forming a sub-assembly comprising a pin 99, a cap block 101 or 102 (as the case may be) a spring 87, and a snap ring 103, on the end 104 of pin 99. Once the rods, springs, etc. have been assembled with the cap blocks 101, 102; the cap blocks themselves are fastened to the side plates 84, 86, by means of suitable bolts 106. Subsequently, the guide plates 76, 77, are positioned on the pins 99 so as to abut against and be supported by stops 107 which may be fastened to pins 99 by braising, set screws, or any other suitable means. Subsequently, nuts 10 are threaded onto the threaded ends of the pins 99 in order to lock the guide plates 76, 77 in place. It will be noted that the upper end 108 of the spacer block 94 is provided with a circular pocket and that such pocket receives an adapter 108 which is fastened thereto by means of a pair of screws 100 (see FIG. 7). Moreover, a tray 109 having a centrally located hole therein is slipped along the adapter, and tabs 105 on the tray prevent the tray from being misoriented with respect to the spacer block 94.

The adapter 108 in turn is provided with a pocket which receives a hard rubber plug and seal which is dimensioned so that it will enter the interior of a hub 110 formed in the end shield. As will be understood, the hard rubber plug and seal 111 necessarily are dimensioned to correspond with the actual dimensions of the end frames being handled at any given time. The seal and plug 111 may help center the end frame on the lift mechanism, but primarily are provided for sealing the shaft opening in the end frame. Thus, at stations such as those where lubricant material is extruded into the lubricant reservoir of the end frame, the plug/seal 111 prevents lubricant material from being extruded out of the end shield. The tray 109 is not always necessary, and is provided primarily for the purpose of catching lubricant material that might be inadvertantly dropped thereon either from an end frame or from a lubricant dispensing head.

A side elevation, with parts removed and parts broken away, and with parts thereof shown in section, is revealed in FIG. 6, and a number of the relationships described hereinabove may be better appreciated from FIG. 6. For example, the relationships of the guide plate 76 and stationary guide plate 81 is readily revealed in this figure and a stop or "latch" is also easily seen in FIG. 6. It will be understood that FIG. 6 is oriented so that the normal direction of flow of parts with respect to the guide rail 76 would be from the right to the left as viewed in FIG. 6. Thus, as a part moves into position over the lift mechanism 66, it must be stopped before the lift 66 can be actuated so as to raise the end shield above the surface of the conveyor chains.

The means that are utilized in the embodiment illustrated herein for stopping end shields (as they move into a lift station) are in the form of a latch 112 which comprises an air cylinder 113, a magnetic reed switch 114, a conventional valve for controlling the supply of air to the cylinder 113, and a specially designed bumper 116 which is threaded onto the rod 117 of the cylinder 113. It will be noted that the bumper 16 is in reality a latch or cap placed on the end of the rod 117. In an actual embodiment of the apparatus illustrated herein (when end frames as illustrated in the above referenced Otto patents were being handled) the cap 116 was machined from a $\frac{1}{2}''$ long piece of cold drawn steel having an initial diameter of 9/16 of an inch. The bar stock was then machined by drilling and tapping a hole through the center thereof, and by turning down the upper end thereof (as viewed in FIG. 6) to a diameter of $\frac{3}{8}$ of an inch. About 7/32 of an inch of the original material remained with the original diameter; and the larger and smaller diameter portions of the cap were joined by a centrally located tapered section which tapered at an angle of 45 degrees. Thus, the axial heighth of the tapered section was approximately 3/32 of an inch, and the difference in the radii of the smaller and larger round sections of the cap also thus was about 3/32 of an inch. After the cap 116 was machined, it was hardened all over to a hardness of from 52 to 54, on the Rockwell C scale. Subsequently, the cap 116 received a black oxide finish in order to inhibit corrosion and oxidation.

The cap 116 does not cause end shields to bounce therefrom as they move into contact therewith while they were being driven by the conveyor. Initial work revealed that if the latch or cap were made from a single diameter member, the end shields would bounce and rattle against the latch, and reliable centering of the end shields over a lifting mechanism would be a problem. However, when the latch was made as illustrated herein and arranged so that an end shield would strike the cap approximately 1/32 of an inch below the point where the smaller diameter ended (i.e. 1/32 of an inch in elevation below where the tapered 45 degree surface commenced), end shields come to a gentle stop, and no problems occur with centering of the end shield over the lifting mechanisms. The cylinder 113 was a "PHD-TOMTHUMB" air cylinder number AV-F-$\frac{3}{4}''$ stroke by $\frac{3}{4}''$ bore with a magnetic piston; and a "PHD-TOM THUMB" magnetic reed switch #CN03-2-01-0 was mounted to the cylinder. The reed switch just described is denoted by reference numeral 114 in FIG. 6.

As will be appreciated from a review of FIG. 6, cylinder 113 is suspended from a weldment attached to the conveyor frame. In addition, it will be understood that the cylinder 113 is located so that the latch 116 is located substantially equal distances between the two conveyor chains so that it will be centrally disposed in the path of the end frames as they are moved on the conveyor. It also should be self evident to a person skilled in the art reviewing FIG. 6 that the seal/plug 111 may be adapted specifically for different end shields. Thus, if an end shield were not to have an opening at the bottom end thereof, the lifting mechanism would need only to be equipped with a plug, spacer, or other uncomplicated fixture which would properly support the end shield during the various operations performed at the stations where lifting mechanisms are provided.

Oil Well Cover Assembly Station

Figure 2:
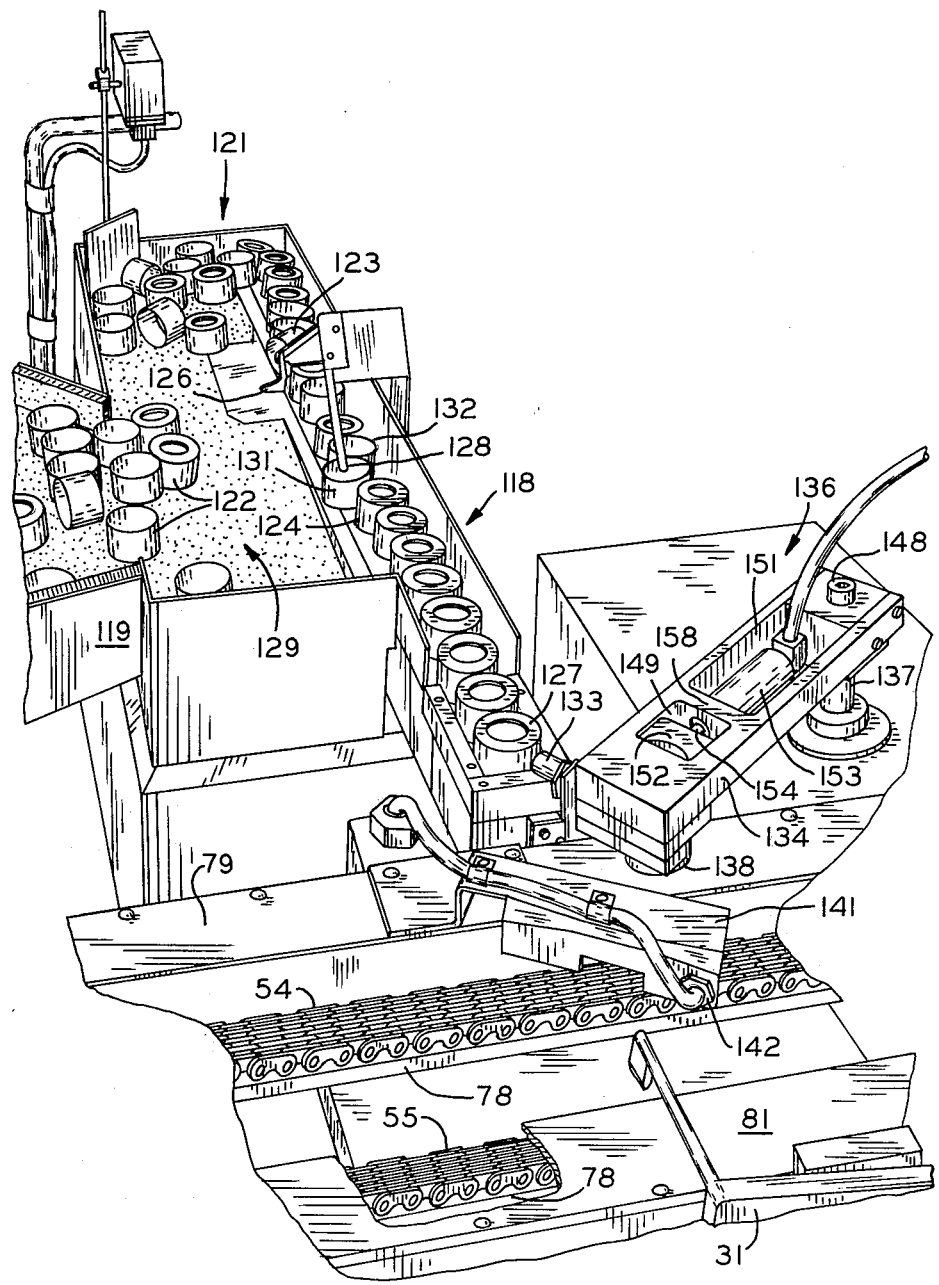
FIG. 2 is a perspective view, with parts removed and parts broken away, of a first assembly station, and wherein parts of a conveyor and a wick sensing mechanism is illustrated.

With reference now to FIG. 2, an oil well cover assembly station 18 utilized in the system disclosed herein will be described. The station 18 includes a DYNA-SLIDE vibratory hopper and feeder, a pick-and-place unit, a pick-up hand, appropriate sensors, one of the escapement mechanisms previously described, and a pressing frame in the form of a previously described lifting mechanism. The hopper 119 and feeder 121 are well known commercially available DYNA-SLIDE units and accordingly, a detailed description thereof is neither desirable or necessary herein.

The oil well covers 122 comprise cup-shaped members that are completely open at one end and that have a hole in the other end thereof. The length of the covers is greater than the diameter thereof and thus, when parts are moved along the feeder, any oil well covers that are laying on their side (such as the cover 123) wil be wiped from the feed track 124 by a first tooling member 126. It is desired that the parts be fed to the pick-and-place unit having an orientation corresponding to the orientation of the cover 127 (with the open end down). In order to assure that the covers are so oriented, a second tooling member 128 is provided in the form of a soft spring finger. The finger 128 falls into the open end of any inverted oil well covers and causes such covers to fall back into the vibratory feed chute 129. Inverted oil well covers are depicted at 131, 132, and the action of spring finger 128 in removing the inverted oil well cover 131 will be understood from FIG. 2.

A proximity switch 133 is mounted at the end of the track and is used to sense the presence of an oil well cover at the end of the track. The signal provided by switch 133 is required before the pick-and-place unit (now to be described) will move into place and attempt to pick up the lead oil well cover 127. Thus, if an oil well cover is not properly positioned at the end of the feed track (in the position occupied by the oil well cover 127) at the time that the pick-and-place arm 134 has moved to its pick-up position, the pick-and-place arm will be deactivated until the parts supply problem has been remedied. Alternatively, if desired, the pick-and-place arm 134 may be permitted to cycle and the signal provided from the proximity switch 133 may be used to activate a warning alarm or warning lights. Any suitable type of sensing device may be used for the switch 133, and in the system actually illustrated herein, a "MICRO-SWITCH" #FYAA3A2-2 was utilized (purchased from MICRO-SWITCH division of Honeywell).

The pick-and-place arm 134 is powered by a transmission 136 which was purchased from the Stelron Cam Company (Trans-Part model J-1, Type A). This unit provides for a 90 degree swing of the arm 134, and a one inch up-and-down stroke at the pick-up point. The unit 136 is driven hydraulically and a flow control valve in the hydraulic line was used to adjust the speed of movement of the pick-and-place arm 134 fastened to the output shaft 137 of the unit 136. As will be understood by persons of ordinary skill in the art, during operation, the arm 134 pivots to a position above the top of the leading oil well cover in the feed track (e.g., oil well cover 127). The arm 134 then dwells over the cover 127 while it is lowered to a position such that it can grip or grasp the lead oil well cover. Thereupon, the arm 134 grasps the lead oil well cover, and once again rises. After the arm 134 has risen so that the oil well cover 127 will clear the rails and other structure associated with the feeder; the arm 134 rotates with shaft 137 to a position such that the oil well cover carried thereby (e.g., oil well cover 138) will be properly positioned over the hub on an end frame that has been stopped on the conveyor.

The escapement mechanism 31 is utilized to insure that end frames are fed one at a time to the oil well cover assembly station. The oil well cover assembly station itself, however, is downstream from the outlet of the escapement mechanism 31 (shown in FIG. 2) and the oil well cover assembly station actually includes a lifting mechanism and a stop or latch device (precisely of the type previously described). Thus, as arm 134 (see FIG. 2) reaches the end of its 90 degree swing away from the vibratory feeder, the oil well cover 138 carried thereby will be properly positioned over an end shield which has progressed through a toggle mechanism, and has engaged a latch or stop. Once the arm 134 has moved to the assembly position, a lift mechanism substantially identical to that described hereinabove raises the end frame and presses the hub of the end frame into the oil well cover 138.

Appropriate backup structure is provided to handle the stress associated with such pressing operation that otherwise would have to handled by the arm 134 and shaft 137; all as is described in more detail hereinbelow. Before leaving FIG. 2 it is finally noted that a "wick sensor" 141 is also provided. The wick sensor 141 includes a "SKAN-A-MATIC" photo-optic sensor 142 which is sensitive to ambient light reflected from a feed wick. If in fact a feed wick is present in the hub of an oil well cover moving into the escapement mechanism 31 (in FIG. 2) the assembly station operates in normal fashion. However, if a wick is not detected by the sensor 142, actuation of the lifting mechanism at the assembly station will be omitted for any end frame lacking an oil feed wick. Then, assuming that the next end frame does include a feed wick, a normal assembly operation will be performed with such next end frame.

FIGS. 2 and 3 should now be considered together, and it should be noted that the wick sensor 141 can be seen in both views. In addition, the escapement mechanism 31 (which is only partially shown in FIG. 2) is revealed in detail in FIG. 3. At the right-hand side of FIG. 3 a frame member 143 also should be noted. For ease of illustration, parts of the frame member 143 have been broken away, but member 143 actually is only one of a pair of vertical upright supports fastened to the side of the conveyor which jointly support, in cantilever fashion, an upper plate which projects across the conveyor. This projecting upper plate is denoted in FIG. 4 by the reference numeral 144.

FIG. 4 illustrates details of the arm 134, and the interrelationships of the backup plate 144, the arm 134, and a lifting mechanism that is substantially the same as described herein previously (in conjunction with FIGS. 5, 6, and 7).

With more specific reference now to the arm 134, it will be noted that the arm 134 is basically formed from a rectangular piece of steel in which a counter board hole 147 is provided for the purpose of mounting the arm onto the shaft 137 by means of a cap screw or bolt 148. In addition, the arm 134 has two openings 149, 151, therein for the purpose of accommodating a movable jaw 152 and a small air cylinder 153, the rod 154 of which is connected to the movable jaw. It should be understood that the exact manner in which the arm 154 is made is not critical. Thus, the arm 134 may be made by taking a flat piece of steel and thereafter boring and milling the material to provide the hole and slots just described. Alternatively, the arm 134 could be cast, fabricated as a weldment, and so forth.

The cylinder 153 (which in the system illustrated herein was a "BIMBA" air cylinder model 04-½) has a threaded collar 156 threaded into a tapped hole 157 in web 158 of arm 134. In addition, the threaded end of the rod 154 is threaded into a tapped hole 159 of the movable jaw 152, and a jam or lock nut 161 is provided to insure that the movable jaw remains properly assembled with the air cylinder rod. It thus should now be understood that actuation of the air cylinder 153 will cause the movable jaw 152 to move back and forth within the opening 149, and the side walls of the opening 149 act as guides or tracks along which the jaw 152 moves.

The end of arm 134 remote from the shaft 137 carries a fixed jaw 162 which is held in assembled relation with, but spaced from, the arm 134 by means of bolts 163 and a spacer plate 164. The spacer plate also acts as a stop for the movable jaw because the end 166 of the spacer plate provides an abutment surface for limiting movement of the movable jaw. It will be noted that both the fixed jaw 162 and the movable jaw 152 are semi-cylindrical in shape so that they may embrace a cylindrical oil well cover such as the cylindrical oil well cover 138, and that the curvature of both of the jaws will closely approximate the curvature of the part to be grasped thereby. Moreover, the entrance 167, 168, of the jaws 162, 152, respectively, is defined by a chamfer or taper so that misalignment between a part to be picked up and the jaws will be compensated for by a centering action that takes place as the part contacted enters the jaws. It of course will be understood that when a part is being picked up by the arm 134, the jaw 152 will be open, and that it closes only after the arm has lowered onto the part to be picked up. However, a spring biased passive jaw set could also be used. Once a part has been picked up by the arm 134, the arm swings 90 degrees and moves under a backup block 169 that is fastened to and carried by the upper backup plate 144. The parts shown in FIG. 4 are dimensioned so that the arm 134 will swing, with a small clearance, under the backup block. When this takes place, the end shield 153 will be resting on chains 54, 55, but the chains will be sliding therepast because the end frame 153 will be arrested from further movement because of its engagement with a cap 116 of a latch as described hereinabove.

After the arm 134 has moved the oil well cover 138 to be in alignment with the bearing supporting hub 62 of the end shield 153, the lifting mechanism 146 shown in FIG. 4 is actuated so that the plug 111 will enter the end shield, and so that the lip 171 of the plug/seal assembly 74 will locate on the outer periphery of a flange 172 on the end shield. The action of the latch at this assembly station provides a sufficient centering action of the end shield hub at the station. Thereafter, continued upward movement of the lifting mechanism 146 (as viewed in FIG. 4) will press the hub 62 of the end shield into the oil well cover 138 and thereby accomplish assembly of the two parts. During the time that the pressing action is taking place, the distal end of the arm 134 is supported by the backup block 169. As the lift mechanism reaches the end of its upward stroke (as viewed in FIG. 4) the cylinder 153 is actuated to open the jaws of; the previously discussed latch is retracted below the plane of the conveyor; the lift mechanism 146 returns to its lower position; and the sub-assembly comprising the end frame 153 and oil well cover 138 are deposited on the conveyor chains 54, 55. Thereupon, the sub-assembly is moved from the oil well cover assembly station and to a station where a feeder wick is tucked into a final seated position within the sub-assembly.

Wick Seating Station

Figure 8:
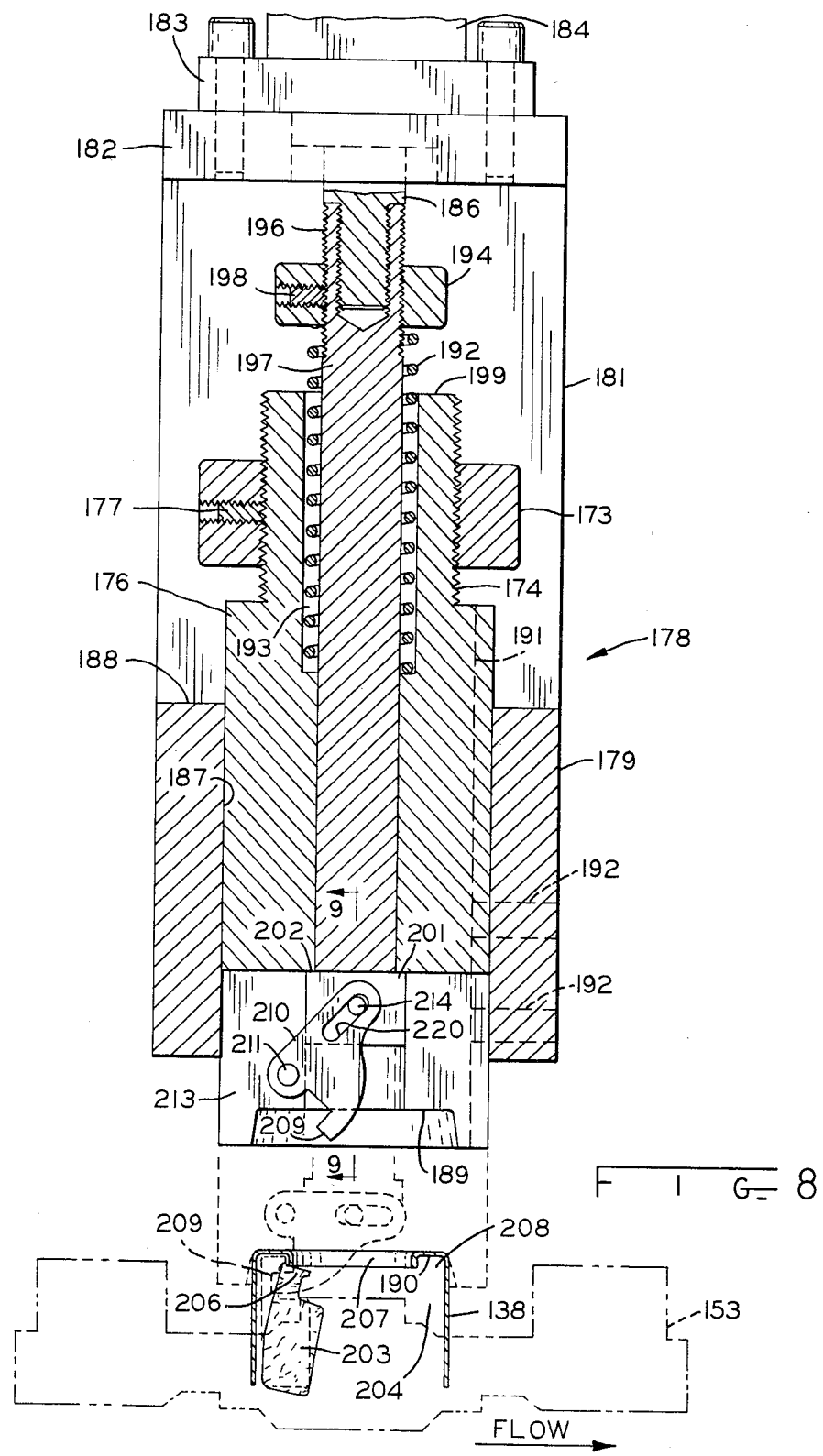
FIG. 8 is a front elevation with parts removed, and parts in section, of a wick seating mechanism located at a wick seating station.

After the sub-assembly of the end frame and oil well cover has been established as described hereinabove the sub-assembly is conveyed to a wick seating station where a unique device pushes feeder wicks back underneath the lip of the oil well cover. Such a feeder device is illustrated in FIG. 8 (and a portion thereof in FIG. 9) and comprises a double acting, spring loaded tooling device having two adjusting means. A first of the adjusting means is a relatively large stop collar 173 which is adjustably threaded onto a reduced diameter portion 174 of a tubular member 176, and held in a fixed position thereon by means of a set screw 177. During the wick seating operation, the tubular device 174 is moved downwardly as viewed in FIG. 8 relative to a fixed supporting member 178. The fixed support 178 is part of a C-frame weldment that includes a lower support block 179, a back frame member 181, and an upper plate 182. The entire weldment 178 is supported from the conveyor frame, and the bottom flange 183 of an air cylinder 184 is fastened to the upper plate 182. The cylinder 184 may be any commercially available cylinder, but in the embodiment illustrated herein, cylinder 184 was a "Hydro-Line" air cylinder series LR2, double-ended, with a 1" bore and a 1½" stroke. When the rod 186 of the cylinder 184 is extended, the cylindrical member 174 will be urged downwardly so that it will slide along a bore 187 in the block 179. However, as the collar 173 reaches the upper surface 188 of the block 179, downward movement of the tubular member 176 is arrested. The collar 173 is adjusted so that when tubular member 176 is in its lower most position (represented in phantom in FIG. 8) an oil well accommodating surface 189 will be in proximity to, but will not actually contact, the upper portion 190 of the oil well cover 138. In order to assure that alignment of the tubular member 176 is maintained with respect to the block 179, a key way 191 is machined into the outer surface of the tubular member 176, and set screws 192 are threaded into tapped holes provided in the lower block 179 so that the ends of the set screws will project into the key way 191 and prevent rotation of the tubular member 176 (about its longitudinally extending axis) relative to the lower block 179.

Downward movement of tubular member 176 (as viewed in FIG. 8) is actually accomplished by means of a spring 192 which is trapped between a seat 193 formed in the tubular member 176 and an adjusting collar 194. The collar 194 is adjustably positioned on the threaded portion 196 of an actuating rod 197 and held in selectable positions thereon by means of a locking set screw 198. The actuating rod 197 in turn is threaded onto and thus fixed for movement with, the rod 186 of the air cylinder.

Thus, as the rod 186 is moved downwardly (as viewed in FIG. 8) the collar 194 tries to compress the spring 192 and the spring in turn forces the tubular member 176 downwardly. However, when collar 173 bottoms against the surface 188, further downward movement of tubular member 176 is prevented with the result that continued movement of rod 186 causes the collar 194 to compress the spring 192. However, when collar 194 then comes into contact with the end surface 199 of the tubular member 176, movement of the collar 194, actuating rod 197, and air cylinder rod 186 is arrested.

It is during the relative movement between actuating rod 197 and tubular member 176 that the wick seating operation is actually performed, all as will be discussed in more detail hereinbelow. However, it is first noted that once a wick seating operation has been performed the cylinder 184 is actuated to fully retract the rod 186 thereof to its initial rest position shown in FIG. 8. Accordingly, when rod 186 starts to retract from its fully extended position, the rod 186, collar 194, and actuating member 197 start to move upwardly but the compression in spring 192 continues to hold tubular member 176 in its lower most position until such time that the enlarged head 201 of actuating member 197 is moved upwardly into engagement with bearing surface 202 on tubular member 176. Once the head 201 has engaged surface 202, continued upward movement of the actuating member 197 will cause tubular member 176 to move upwardly and back to the initial position thereof as depicted in solid lines in FIG. 8.

With reference now to the lower portion of FIG. 8, it will be noted that the oil well cover sub-assembly includes, among other things, a feeder wick 203 which is used for feeding the lubricant from a lubricant storage material (that ultimately is disposed within an oil well reservoir in the space 204) to a bearing carried by the end frame 153. Moreover, it will be noted that the feeder wick 203, as shown in FIG. 8, is positioned such that an end 206 thereof lies partly within an opening defined by the lip 207. The feeder wick 203 is positioned in this fashion at the time that it is initially inserted into the end frame 153 and before the end frame 153 first enters the conveyor. The feeder wick is so positioned so that it will not interfere with the automated assembly of the oil well cover 138 and the end frame. However, in a finally assembled end frame, it is necessary that the end 206 be positioned within a region or channel 208 in the oil well cover that is defined by the outer wall of the oil well cover and the lip 207 thereof. This, it is necessary to tuck or seat the feed wick so that the end 206 thereof will lie within the channel 208.

The tucking or seating of the feed wick is accomplished by means of a finger 209 which moves from a position remote from the feed wick to a final dotted position represented in phantom in FIG. 8. Thus, the finger 208 is initially centrally positioned with respect to the oil well cover and subsequently pivoted to its phantom line position, during which action the finger 209 engages the end 206 of the feed wick and tucks it into its finally seated position. The finally seated position of feed wick is also illustrated in phantom in FIG. 8.

The finger 209 is part of a pivoting lever which is pivotally mounted by means of a pivot 211 in a bifurcated portion of the tubular member 176. The bifurcated portion of tubular member 176 is actually established by milling the tubular member to provide two bifurcations 212, 213 (which are more readily seen in FIG. 9).

From a comparison of FIGS. 8 and 9 it will be understood that the lever 210 (which includes the finger 209) is provided with a slot 220 and that an actuating pin in the form of a shouldered screw 214 (which is anchored in the actuating member 197) is trapped within the slot 220. Thus, when actuating member 197 moves downwardly relative to the tubular sleeve 176, the screw 214 will cause lever 212 to pivot about the pivot 211. The pivot 211 is established by a shouldered screw 216 which is threaded into and carried by the bifurcation 212 formed from the tubular member 176. However, a returning or upward movement of the actuating member 197 relative to the tubular member 176 will cause the lever 210 to pivot upwardly and assume the relative position thereof as shown in solid lines in FIG. 8.

It should now be understood that the assembly system herein disclosed provides a means whereby an end frame and oil well cover sub-assembly having an unseated oil feeder wick may be stopped by an escapement mechanism identical to the mechanism 31 described hereinabove at a position beneath the wick seating apparatus shown in detail in FIGS. 8 and 9. Thereafter, while the escapement mechanism continues to hold the end frame in position, the air cylinder 184 is actuated whereupon the finger 209 of the lever 210 will move downwardly into the central portion of the oil well cover. The lever 212 then pivots causing the finger 209 to engage the oil feed wick and move the feed wick radially outwardly to a fully seated postion. Subsequently, the lever 212 pivots the finger 209 back to the central portion of the oil well cover, and the wick seating apparatus (under the influence of cylinder 184) returns to its upper dwell position. Thereupon, the escapement mechanism releases the end shield assembly for movement once again with the conveyor. Preferably, immediately adjacent to but downstream of the wick seating apparatus, a proximity detector is provided to insure that an oil well cover 138 in fact has been assembled with an end frame. The desirability of insuring the presence of an oil well cover will be understood in view of the fact that the next work station downstream from the wick seating apparatus is a lubricant injection station where lubricant is injected into the end shield assembly within the reservoir that is defined in part by the oil well cover.

Assuming that a proximity detector has provided a signal indicating that an oil well cover in fact is in place on the end frame, the end shield assembly proceeds from the wick seating station depicted in FIG. 8 to yet another latch mechanism which includes a cap 116 as described hereinabove; and stops over a lifting mechanism.

At the lubricant injecting station, a lifting mechanism as shown in FIG. 6 herein underlies a lubricant injecting head of known design. Such injecting head may be a head marketed by the Permawick Company of Detroit, or alternatively may be a head substantially idential with the heads disclosed in the above referenced Stoner, Tomson, and Tomson et al applications.

At the lubricant injecting station, it is preferable that extrudable lubricant retaining material be extruded under pressure into the above mentioned lubricant reservoir of the end shield assembly during the time that the lifting mechanism at such station has raised the end frame into operative position with respect to the lubricant injecting head. It will be appreciated that during this operation, the plug and seal 111 (see FIGS. 5 and 6) will be of substantial value in preventing lubricant retaining material from being extruded all the way through an end shield and onto the conveying equipment. Moreover, the tray 109 (see FIGS. 5 and 6) will be of substantial value in that it will collect any lubricant retaining material or lubricant that inadvertantly may escape from end shields during the lubricant injecting process.

After lubricant has been injected into the end shield assembly, the assembly is lowered from engagement with the lubricant injecting head and conveyed downstream. At this point in time the end shield may be discharged from the conveyor system.

However, others have suggested that it would be desirable to move the end shield assembly to a subsequent lifting station (after the lubricant injection process) retain the end shield assembly at the lifting station, and lift it upwardly so that a plug or other forming device can enter the oil well cover and insure that the lubricant retaining material is properly positioned and packed into the lubricant reservoir. Moreover, it has been suggested that once the lubricant retaining forming operation has been performed as just described; the end shield assembly then move into a final escapement mechanism at a final cleaning station where an air venturi and vacuum cleaning device would be lowered over the oil well cover. Thereupon excess lubricant retaining material that may be present around the exterior of the oil well cover would be blown and suctioned away. Subsequently, the final escapement mechanism would release the finally finished end shield assembly for movement with the conveyor to a tote box, a subsequent conveyor system, etc.

While the lubricant retaining material shaping operation and subsequent cleaning operation have been suggested by others, it is believed that preferred systems embodying the present invention would in fact incorporate such additional procedural steps and it is for this reason that such steps have been disclosed herein.

From all of the foregoing, it should now be understood that I have shown and described preferred methods that accomplish the hereinabove stated objects of the invention; one preferred system that has utility in conjunction with practicing such methods; and new and improved apparatus and work station operational procedures that facilitate operation of such system and the practice of methods embodying the inventions disclosed herein. However, the disclosures contained herein should be construed as being exemplary and not as being by way of limitation; and it will be understood that modifications in the methods, system, and apparatus disclosed herein will readily suggest themselves to persons skilled in the art. Accordingly, it is intended that the invention itself should be limited only by the scope of the claims that are appended hereto and that form part of my disclosure.

What I claim as new and desire to secure by Letters Patent of the United States is:

1. A method of assembling an end shield assembly for an electric motor wherein the assembly includes at least an end frame, a bearing supported by the end frame, lubricant for the bearing, a feed wick for transmitting lubricant to the bearing, and an oil well cover that at least partly defines a lubricant storage reservoir, the method comprising: intentionally placing a feed wick on the end frame in a proper temporary position relative to the end frame wherein such proper temporary position is improper for properly feeding oil to a shaft but proper for permitting mechanized assembly of an oil well cover and end frame; assembling an oil well cover with the end frame by pressing the oil well cover onto a centrally located hub that forms part of the end frame and thereby substantially surrounding the temporarily properly positioned feed wick; seating the feed wick in a final position relative to the oil well cover after the oil well cover and end frame are assembled together; and thereafter admitting an initial charge of bearing lubricant to the oil reservoir.

2. The method of claim 1 wherein seating the feed wick comprises the step of moving a wick seating element into the oil well cover, engaging the feed wick with such element and moving the feed wick to a final position; and thereafter removing the seating element from the oil well cover.

3. The method of claim 1 wherein the method further includes moving the end shield assembly on a conveyor and selectively stopping the assembly with escapement and latch mechanisms.

4. The method of claim 3 wherein the method further includes lifting the end shield from the conveyor while it is stopped by a latch mechanism.

5. A method of assembling an end shield assembly for an electric motor wherein the assembly includes at least an end frame, a bearing supported by the end frame, lubricant for the bearing, a feed wick for transmitting lubricant to the bearing, and an oil well cover that at least partly defines a lubricant storage reservoir, the method comprising: placing a feed wick on the end frame in a temporary position relative to the end frame; assembling an oil well cover with the end frame and thereby substantially surrounding the temporarily positioned feed wick; seating the feed wick in a final position relative to the oil well cover; and thereafter admitting bearing lubricant to the oil reservoir; said method further including moving the end shield assembly on a conveyor and selectively stopping the assembly with escapement and latch mechanisms, lifting the end shield from the conveyor while it is stopped by a latch mechanism, and pressing the oil well cover and end frame together while lifting the end shield and thereby performing said step of assembling the oil well cover with the end frame.

6. The method of claim 5 further including performing said step of admitting while the end frame is lifted from the conveyor.

7. The method of claim 6 further including performing the seating step while the end shield is stopped by an escapement mechanism.

8. The method of claim 5 wherein the step of seating the feed wick is performed while the end shield is stopped by an escapement mechanism.

9. A method of assembling an end shield assembly for an electric motor wherein the assembly includes at least an end frame, a bearing supported by the end frame, lubricant for the bearing, a feed wick for transmitting lubricant to the bearing, and an oil well cover that at least partly defines a lubricant storage reservoir, the method comprising: placing a feed wick on the end frame in a temporary position relative to the end frame; moving the end frame having the feed wick temporarily positioned thereon along a conveyor to an escapement mechanism and sensing the presence of the feed wick on the end frame, and selectively stopping the end frame at an oil well cover assembly station when the feed wick has been sensed to be present; moving an oil well cover into an overlying relation with respect to the end frame; lifting the end frame from the conveyor and into a pressing and assembling relationship with the oil well cover and thereby assembling together the end frame and oil well cover; moving the assembled oil well cover and end frame into engagement with the conveyor; transporting the oil well cover, end frame, and feeder wick temporarily positioned on the end frame to a wick seating station and into an escapement mechanism; retaining the end frame at the wick seating station with the escapement mechanism; engaging the temporarily positioned feed wick with a wick seating member and moving the feed wick to a final seated position with respect to the end frame and interiorly of the oil well cover; releasing the end frame for movement on the conveyor and sensing the presence of the oil well cover assembly therewith; stopping the end frame at a lubrication station; lifting the end frame from the conveyor and into lubricant receiving relationship with a lubricant dispensing means; dispensing lubricant into the interior of the oil well cover and into communication with the feed wick; lowering the end frame from the lubricant dispensing means and into engagement with the conveyor means; and conveying the end frame, complete with oil well cover, feed wick, and lubricant away from the lubrication station.

10. A method of assembling an end shield assembly for an electric motor wherein the assembly includes at least an end frame, a bearing supported by the end frame, lubricant for the bearing, a feed wick for transmitting lubricant to the bearing, and an oil well cover that at least partly defines a lubricant storage reservoir, the method comprising: moving an end frame having a feed wick temporarily positioned thereon along a conveyor to an escapement mechanism, and stopping the end frame at an oil well cover assembly station; moving an oil well cover into overlying relation with respect to the end frame; lifting the end frame from the conveyor and into a pressing and assembling relationship with the oil well cover and thereby assembling together the end frame and oil well cover; transporting the oil well cover, end frame, and feeder wick temporarily positioned on the end frame to a wick seating station and retaining the end frame at the wick seating station; and engaging the temporarily positioned feed wick with a wick seating member and moving the feed wick to a final seated position with respect to the end frame and interiorly of the oil well cover; releasing the end frame for movement on the conveyor and sensing the presence of the oil well cover assembled therewith; stopping the end frame at a lubrication station; dispensing lubricant into the interior of the oil well cover and into communication with the feed wick; and conveying the end frame, complete with oil well cover, feed wick, and lubricant away from the lubrication station.

11. A method of assembling an end shield assembly for an electric motor wherein the assembly includes at least an end frame, a bearing supported by the end frame, lubricant for the bearing, a feed wick for transmitting lubricant to the bearing, and an oil well cover that at least partly defines a lubricant storage reservoir, the method comprising: moving an end frame having the feed wick temporarily positioned thereon along a conveyor to an escapement mechanism, and stopping the end frame at an oil well cover assembly station; moving an oil well cover into overlying relation with respect to the end frame; assembling together the end frame and oil well cover; transporting the oil well cover, end frame, and feeder wick temporarily positioned on the end frame to a wick seating station; and engaging the temporarily positioned feed wick with a wick seating member and moving the feed wick to a final seated position with respect to the end frame and interiorly of the oil well cover.

12. A method of seating a wick in an end frame assembly comprising at least an end frame, an oil well cover, and a feed wick, wherein the oil well cover is disposed about the feed wick and the feed wick is temporarily positioned with respect to the end frame and oil well cover, the method comprising: moving a feed wick seating member along an opening defined by the oil well cover; engaging the feed wick with the wick seating member; moving the feed wick from its temporary position relative to the end frame and oil well cover to a finally seated position; and removing the wick seating member from the interior of the oil well cover; said method also particularly comprising moving the feed wick seating member axially with respect to the oil well cover during the first aforementioned moving step; arresting further axial movement of the wick seating member relative to the oil well cover; pivoting the wick seating member with respect to the oil well cover and engaging and seating the feeder wick with the wick seating member during the pivotal movement thereof; pivoting the wick seating member away from the feeder wick after the feeder wick has been seated in its finally seated position; and axially moving the wick seating element with respect to the oil well cover and away from the oil well cover and feed wick during the aforementioned removing step.

13. Apparatus for seating a feed wick that is temporarily positioned on an end frame for an electric motor and that is substantially surrounded by an oil well cover having a centrally disposed opening therein; said apparatus comprising: means for supporting the end frame, oil well cover, and feed wick in a predetermined position; a mechanism movable toward the oil well cover including means for insuring alignment of the oil well cover with such mechanism; said mechanism including a wick seating finger pivotally supported thereby and axially movable therewith toward the oil well cover; means for moving the wick seating finger axially into the centrally disposed opening of the oil well cover; said mechanism further comprising means for pivoting the wick seating finger relative to said mechanism and the oil well cover and along a path for engaging the temporarily positioned feed wick and thereby forcing the temporarily positioned feed wick to a final seated position; said means for moving the mechanism axially also being operative to move the mechanism axially away from the oil well cover; said wick seating finger being interconnected in the mechanism so that movement of portions of the mechanism away from the oil well cover causes the wick seating finger to pivot away from the feed wick and move axially away from the oil well cover.

14. The invention of claim 13 wherein said mechanism includes a frame, the apparatus includes a prime mover supported by the frame, the mechanism includes first and second members movable longitudinally and telescopically relative one to another said first and second members being interconnected with one another by a lost motion connection; and wherein said wick seating finger is pivotally connected at one location to the first one of said members and said wick seating finger is pivotally connected at a second location with the second one of said members.

15. The invention of claim 14 wherein the lost motion connection includes a spring compressively retained between spring confining surfaces carried by the first and second members, and wherein said spring normally urges the first and second members in a first direction relative to one another.

16. The invention of claim 15 wherein said wick seating finger is mounted for only pivotal motion on the first member and is free to undergo pivoting and sliding movement with respect to the second member.

17. A method of assembling an oil well cover with an end frame comprising a centrally disposed hub and laterally extending portions; said method including moving the end frame with a feeder wick positioned thereon to an assembly station and arresting further movement of the end frame at the assembly station; grasping the oil well cover about the outer periphery thereof and moving the oil cover into overlying and aligned relationship with the hub of the end frame; relatively moving the oil well cover and end frame toward one another and seating the oil well cover on the hub of the end frame; ungrasping the oil well cover; and moving the end frame away from the assembly station; the step of moving the end frame to the assembly station comprising engaging the end frame with conveyor means that engage laterally disposed portions of the end frame; the step of arresting further movement of the end frame including moving a beveled abutment surface into the path of movement of the end frame and thereby arresting continued movement of the end frame by reason of contact between the end frame and the beveled surface; and the step of relatively moving the end frame and oil well cover including elevating a lift mechanism positioned beneath the end frame and thereby both moving the end frame toward the oil well cover and elevating the end frame from the conveyor means; the method further including conveying the assembled oil well cover and end frame from the assembly station to a wick seating station and thereupon arresting movement of the end frame along the conveyor means; seating the previously positioned feed wick in a final seated position within the oil well cover; and subsequently releasing the end frame for continued movement with the conveyor means.

18. The method of claim 17 wherein seating the previously positioned feed wick includes moving a wick seating member axially and pivotally with respect to the oil well cover so that the wick seating member moves from the exterior of the oil well cover into the interior of the oil well cover and into engagement with the feed wick; and thereafter removing the wick seating member from the interior of the oil well cover.

* * * * *

UNITED STATES PATENT AND TRADEMARK OFFICE
CERTIFICATE OF CORRECTION

PATENT NO. : 4,348,791
DATED : September 14, 1982
INVENTOR(S) : James M. Tomson

It is certified that error appears in the above-identified patent and that said Letters Patent is hereby corrected as shown below:

Column 19, Claim 9, line 26, "assembly" should be
-- asembled--.

Signed and Sealed this

Sixth Day of August 1985

[SEAL]

Attest:

DONALD J. QUIGG

Attesting Officer   Acting Commissioner of Patents and Trademarks